Patented Aug. 10, 1926.

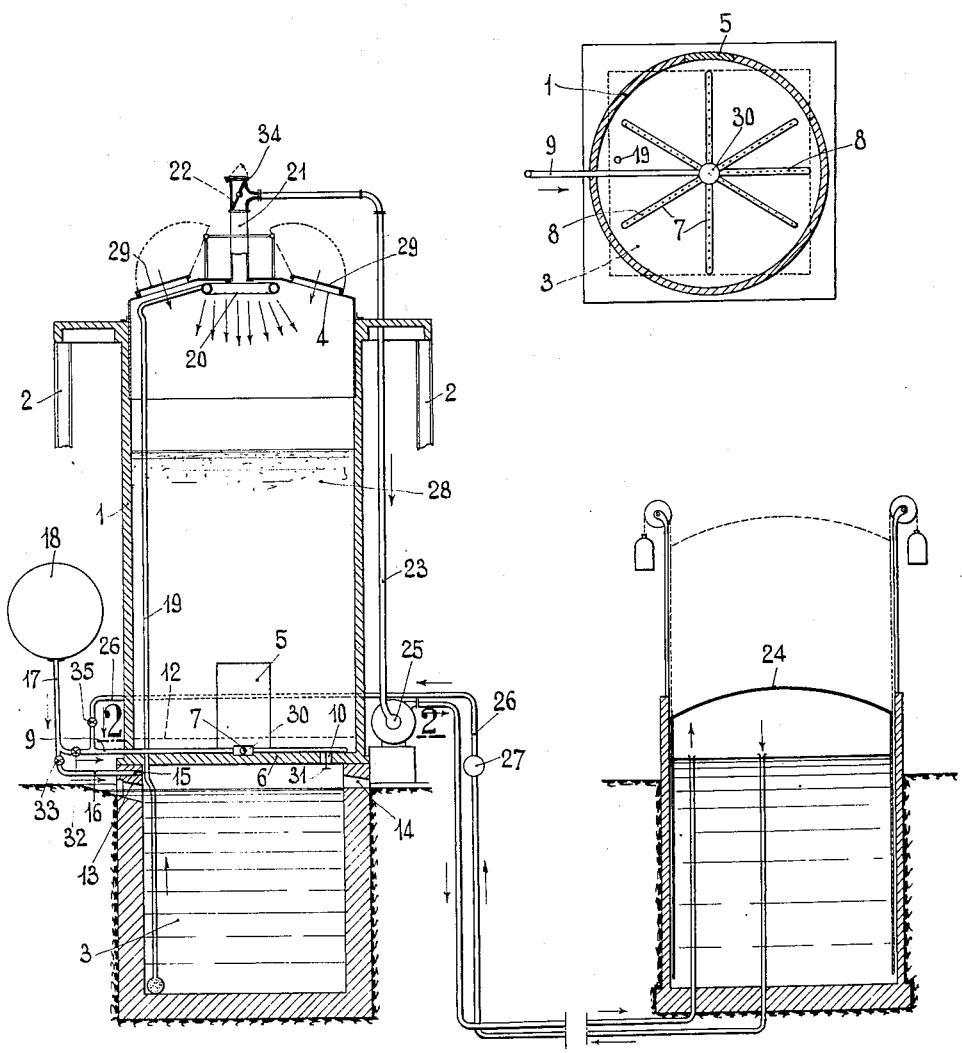

1,595,445

UNITED STATES PATENT OFFICE.

LUIGI BOGGIANO-PICO, OF TURIN, ITALY.

APPARATUS FOR TREATING ORGANIC RESIDUES.

Application filed October 31, 1924, Serial No. 747,059, and in Italy October 7, 1924.

This invention relates to apparatus for the destruction of organic residues and the utilization of the by-products, so to say, which are obtained therefrom. Its object, briefly stated, is the provision of an improved plant or apparatus comprising a fermentation chamber, to receive the refuse and, if desired, additional materials or substances designed to undergo a transformation, and a pit at the bottom of the aforesaid chamber to receive sewage water; said chamber and pit being associated with devices for forcing a current of air through the material and for introducing the sewage water into the material.

On the annexed drawing is illustrated diagrammatically a plant according to the present invention, and:—

Fig. 1 is a vertical diagrammatic section of the same, and Figure 2 is a horizontal section of the fermentation chamber on line 2—2 of Figure 1.

Said plant comprises a cylindrical tower 1 which is preferably made of concrete and is enclosed in a metal supporting frame 2, and a pit 3 located under said tower and intended to receive sewage waters for moistening solid residues to be treated so as to assist their fermentation.

Said tower 1 provides a treatment chamber 28 ad has top openings 4 for charging the material therein, doors 29 being provided for sealing said openings; at the bottom of said tower are provided openings 5 for removing the treated material and having means for sealing them.

A partition 6 is located intermediate pit 3 and chamber 28 and above said partition are located radial pipes 7 (see Figure 2) having top perforations 8 and connected with a feeding pipe 9 leading to a common distributing chamber 30 to which said pipes 7 are connected.

Said partition 6 has orifices 10 provided with valves 31 adapted to close them when a pressure is produced in pit 3, and excess liquid collecting at the bottom of the tower 1 being thus allowed to return to pit 3.

Above pipes 7 is arranged a perforated metal supporting plate 12 on which rests the material introduced into the chamber 28.

The pit 3 comprises a port 13 for introducing sewage waters, an outlet 14 for the excess liquid and a port 15 leading to a pipe 16. The pipes 9 and 16 are connected through valves 32 and 33 with a pipe 17 leading to a reservoir 18 for compressed air. On the bottom of pit 3 opens a pipe 19 leading to a perforated distributing tube 20 located at the top of the tower 1.

Into the top of tower 1 opens a duct 21 adapted to be put in communication with atmosphere through a valved outlet 34 or with a gas depurating apparatus which in the embodiment illustrated may consist of a gas washing siphon containing a saturated solution of iron sulphate.

A valve 22 is inserted in the duct 21, and said valve provides for directing at will the evolved gases into a branch 23 leading to a gas holder 24 which is illustrated in the form of a water seal gas holder.

In the branch 23 is inserted a blower 25 intended to exhaust the gases evolved in the chamber 28 into the pipe 23, which gases are heavier than air, from the top of the chamber 28, and to force them through said pipe into said gas holder 24.

The gas holder 24 is connected by means of a pipe 26 with the pipe 9, this pipe 26 being provided with a valve 35 and having included in it a compressor 27.

Washing tanks containing suitable materials may be used in lieu of or in cooperation with said gas holder for storing and fixing said gases.

The operation is carried out as follows: The material to be treated is introduced into the chamber 28 of the tower 1 through top ports 4 and a free space is left above it at the top of said chamber for the gases to be evolved therefrom, said charge including organic residues, sweepings, offals, and so on, to be subjected to fermentation, and if desired an amount of added material (as leucites or other phosphatic or potassic rocks) capable of undergoing transformation in the presence of gases of fermentation.

Sewage waters are introduced into the pit 3 through the port 13 up to the level of the exhaust port 14, and then said ports 13 and 14 are suitably sealed. Then compressed air is introduced from reservoir 18 through pipe 17, valve 33 and pipe 16 into pit 3 to force the liquid to rise in pipe 19 and distributor 20 and to be sprayed over the material in chamber 28; this wetting operation is repeated for a period of some days and then compressed air is introduced through pipe 17, valve 32, pipe 9, chamber 30 and perforated pipes 7, said air entering throughout the material within the tower 1 and distributing therein.

The introduction of compressed air acts both to supply the required amount of oxygen to support fermentation and to dry the material; the air supply is continued until the moisture content of gases escaping from the pipe 21 has a value of about 25%, the said moisture being measured by means of a hygrometer located in the exhaust duct 21.

Then the exhaust valve 34 is closed and the material contained in chamber 28 undergoes fermentation, the temperature rising at this time in said chamber.

The fermentation of the material is completed when the temperature falls down in the material undergoing treatment, and such a temperature fall is ascertained by means of thermometers located in the chamber 28 with their bulbs in the mass of the material and duly protected by enclosing tubes, said thermometers being provided with suitable means for reading the temperature value from outside as well known. After the fermentation is completed, the material charged into the chamber 28 is found in the state of a dry and aseptic powder and the mineral materials added thereto are also found in soluble condition due to the action of the gases evolved in the mass during the fermentation; then the exhauster 25 is put in operation and the gases left free in the mass and in the chamber 28 are conveyed to the gas holder 24, the dry material being thereafter removed from chamber 28 through openings 5, in the state of a dry and aseptic powder which has been found to be a very valuable fertilizer for vegetables. Thereafter a new charge is introduced into the tower 1 and pit 3 and the operation is repeated.

During the operation the compressor 27 may be operated to drive the gases collected in the gas holder 24 into the material under treatment for the purpose of carrying said gases again into contact with the solid material for their absorption, this operation being preferably carried out after the fermentation of the material is completed, in order to cause the mineral material added to the charge to be entirely converted into soluble compounds by the action of said gases.

To prevent ammonia contained in the gases collected in the gas holder 24 from dissolving in the seal water of the gas holder, a layer of oil is preferably located on said water.

The operation of the plant may be made continuous by removing from time to time a portion of the treated material from the bottom of the tower 1 and introducing fresh material at its top.

The described plant provides means for destroying organic residues and for recovering the materials and gases evolved in the fermentation process, the gases evolved in said process being either collected for use or combined with materials to produce valuable fertilizers, the escape of said gases into the atmosphere being in any case prevented.

What I claim as my invention and desire to secure by United States Letters Patent is:—

1. Apparatus for treating organic residues comprising a tower providing a fermentation chamber, a pit for sewage water under said tower, a partition intermediate said tower and pit, said partition having ports for exhaust of excess liquid from said chamber, means for introducing the material into said chamber, means for removing the treated material from said chamber, means for introducing said sewage waters from said pit into said chamber and means for forcibly causing air to pass through said chamber to support the fermentation of the material.

2. Apparatus for treating organic residues comprising a tower providing a fermentation chamber, a pit for sewage water under said tower, a partition intermediate said tower and pit, said partition having ports for exhaust of excess liquid from said chamber, means for introducing the material into said chamber, means for removing the treated material from said chamber, means for introducing said sewage water from said pit into said chamber, means for forcibly causing the air to pass through said chamber to support the fermentation of the material and means connected with the top of said chamber to collect the gases evolved during fermentation.

3. Apparatus for treating organic residues comprising a tower providing a fermentation chamber, a pit for sewage water under said tower, a partition intermediate said tower and pit, said partition having ports for exhaust of excess liquid from said chamber, means for introducing the material into said chamber, means for removing the treated material from said chamber, means for introducing said sewage waters from said pit into said chamber, means for forcibly causing air to pass through said chamber to support the fermentation of the material, an exhauster connected with the top of said tower, and a gas holder connected with said exhauster for collecting the gases evolved during fermentation.

4. Apparatus for treating organic residues comprising a tower providing a fermentation chamber, a pit for sewage waters under said tower, a partition intermediate said tower and pit, said partition having ports for exhaust of excess liquid from said chamber, means for introducing the material into said chamber, means for removing the treated material from said chamber, means for introducing said sewage waters from said pit into said chamber, means for forcibly causing air to pass through said chamber to support the fermentation of the material, means for collecting and storing the gases evolved during fermentation in said chamber, and means for introducing said gases again into the material in said chamber.

5. Apparatus for treating organic residues comprising a tower providing a fermentation chamber, a pit for sewage waters under said tower, a partition intermediate said tower and pit, said partition having ports for exhaust of excess liquid from said chamber, means for introducing the material into said chamber, means for removing the treated material from said chamber, means for introducing said sewage waters from said pit into said chamber, a perforated material supporting partition at the bottom of said chamber, fluid distributing means under said perforated partition, a compressed air supply, means for collecting and storing gases evolved in said chamber during fermentation, and means for connecting at will said fluid distributing means with said compressed air supply or with gas storing means.

6. Apparatus for treating organic residues comprising a tower providing a fermentation chamber, a pit for sewage waters under said tower, a partition intermediate said tower and pit, said partition having ports for exhaust of excess liquid from said chamber, means for introducing the material into said chamber, means for removing the treated material from said chamber, means for leading said sewage waters from said pit into said chamber, a perforated material supporting partition at the bottom of said chamber, fluid distributing means under said perforated partitions, a compressed air supply, means for collecting and storing gases evolved in said chamber during fermentation, and means for connecting said compressed air supply with said fluid distributing means or with said pit to force said sewage waters into said chamber.

7. Apparatus for treating organic residues comprising a tower providing a fermentation chamber, a pit for sewage waters under said tower, a partition intermediate said tower and pit, said partition having ports for exhaust of excess liquid from said chamber, means for introducing the material into said chamber, means for removing the treated material from said chamber, means for leading said sewage waters from said pit into said chamber and distribute the same therein, a perforated material supporting partition at the bottom of said chamber, fluid distributing means under said perforated partition, a compressed air supply, means for collecting and storing gases evolved in said chamber during fermentation, means for connecting at will said fluid distributing means with said compressed air supply or with said gas collecting means, and means for causing said compressed air to act in said pit to drive said sewage waters into said chamber.

In testimony whereof I affix my signature.

LUIGI BOGGIANO-PICO.